Figure 1:
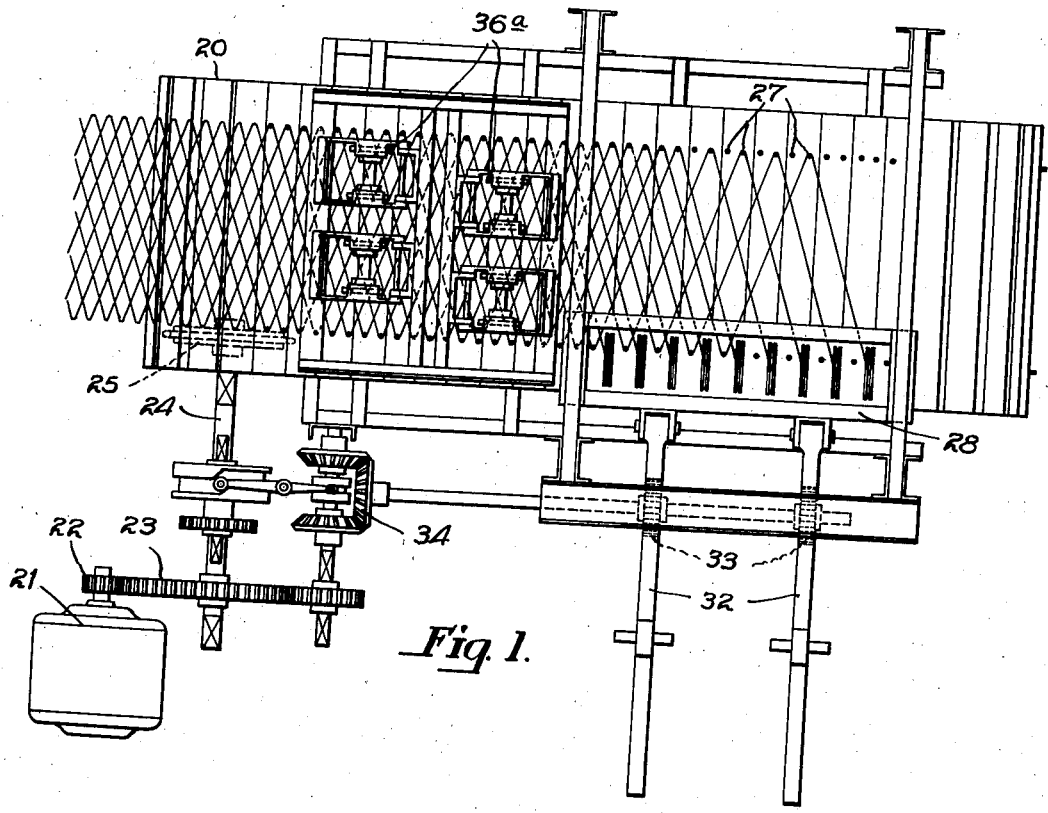

Feb. 27, 1940.     W. E. REED     2,191,682
METHOD OF MAKING FABRICS
Filed Aug. 1, 1938     5 Sheets-Sheet 1

INVENTOR
William Edgar Reed,
BY Archworth Martin,
ATTORNEY.

Feb. 27, 1940.  W. E. REED  2,191,682
METHOD OF MAKING FABRICS
Filed Aug. 1, 1938   5 Sheets-Sheet 2

INVENTOR.
William Edgar Reed,
BY Archworth Martin,
ATTORNEY.

Feb. 27, 1940.　　　　　W. E. REED　　　　　2,191,682
METHOD OF MAKING FABRICS
Filed Aug. 1, 1938　　　5 Sheets-Sheet 3
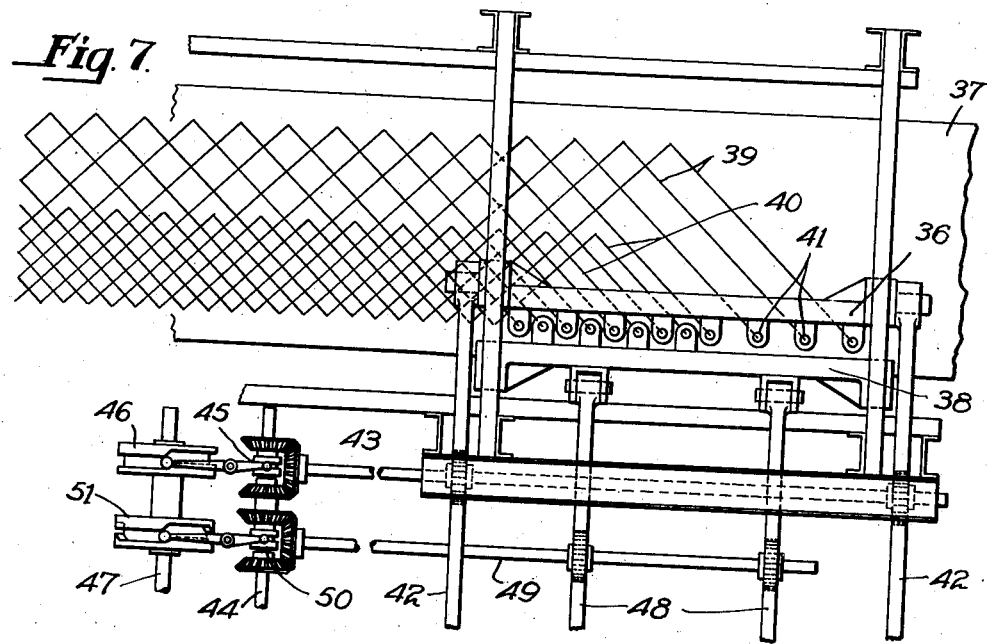
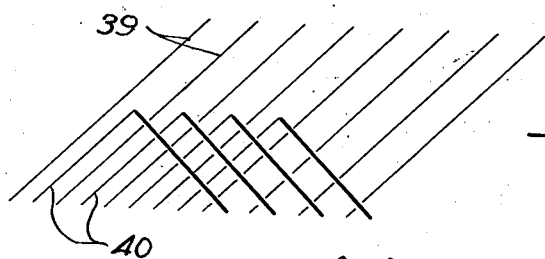
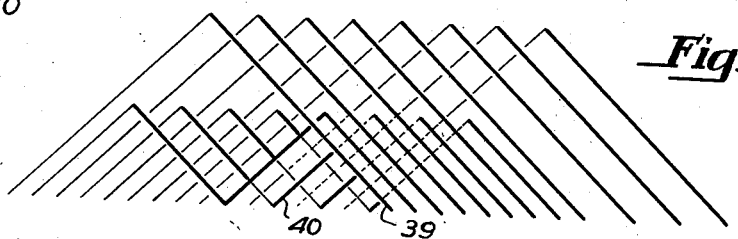
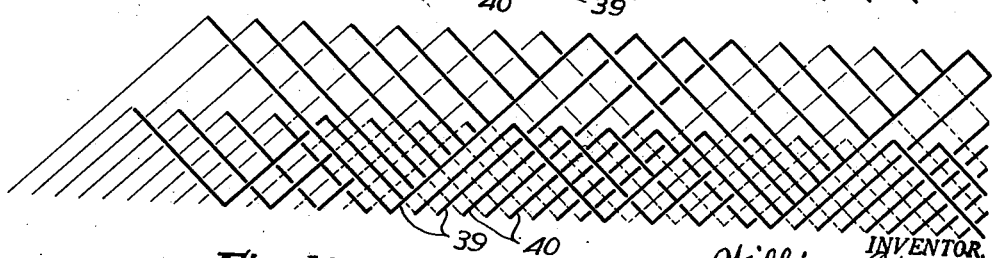
INVENTOR.
William Edgar Reed,
BY Archworth Martin,
ATTORNEY.

Feb. 27, 1940.                 W. E. REED                   2,191,682
                         METHOD OF MAKING FABRICS
                            Filed Aug. 1, 1938            5 Sheets-Sheet 4

INVENTOR.
William Edgar Reed,
BY Archworth Martin,
ATTORNEY.

Feb. 27, 1940.  W. E. REED  2,191,682
METHOD OF MAKING FABRICS
Filed Aug. 1, 1938  5 Sheets-Sheet 5

INVENTOR.
William Edgar Reed,
BY Archworth Martin,
ATTORNEY.

Patented Feb. 27, 1940

2,191,682

UNITED STATES PATENT OFFICE 2,191,682

METHOD OF MAKING FABRICS

William Edgar Reed, Pittsburgh, Pa.

Application August 1, 1938, Serial No. 222,411

12 Claims. (Cl. 140—112)

My invention relates to a method of making fabrics, including wire fabrics such as are employed for fencing, reinforcements, screens, cloth and other mesh-like structures, and constitutes in part a continuation of my application resulting in Patent No. 2,125,583, issued August 2, 1938.

One object of my invention is to provide a method of making a fabric that possesses various new advantages in the way of form, structural characteristics, flexibility, elasticity and strength as compared to fabrics of the prior art.

Another object of my invention is to provide a method of producing mesh formed of continuously extending strands or sets of strands, with the strands of one set positioned in such relation to the strands of the other sets that the fabric thus produced will have desired differences in mesh spacing, structural characteristics and rigidity, as between various portions thereof.

Still another object of my invention is to provide a method of making wire fabric of the welded type, by the employment of continuously-extending wires, without the necessity of cutting, fitting, straightening, holding and welding separate short lengths of material, with consequent saving of expense and facilitating more rapid and better manufacture thereof, and in a continuous operation.

Still another object of my invention is to provide a method of making fabric made of diagonally-extending, continuous strands that intersect or interlace, or of strands that extend in various directions and intersect or interconnect, and are attached together at part or all of their crossings, or are laid upon, into or between other materials, or upon which other material is laid of which they may form a part thereof or reinforcement or surfacing therefor, and which materials may retain the strands in position without their crossings being united, or of arranging strands so that some strands hold others in position.

Still another object is to make fabric of different multiple thicknesses or plies throughout, or only in certain surface areas.

Still another object is to provide duplex or multiplex fabrics which are interlaced or intermeshed.

A further object is to provide a fabric that is made without twisting of the strands, and in which there are no inherent torsional strains caused by its method of formation.

Figure 2:
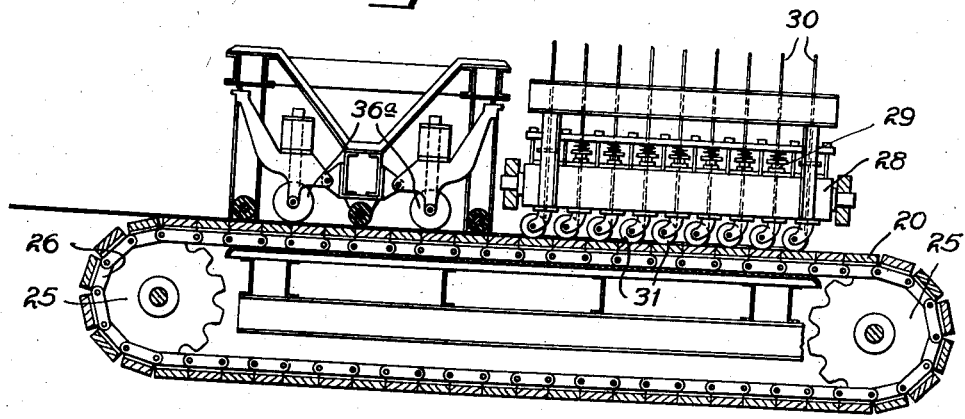
Figure 3:
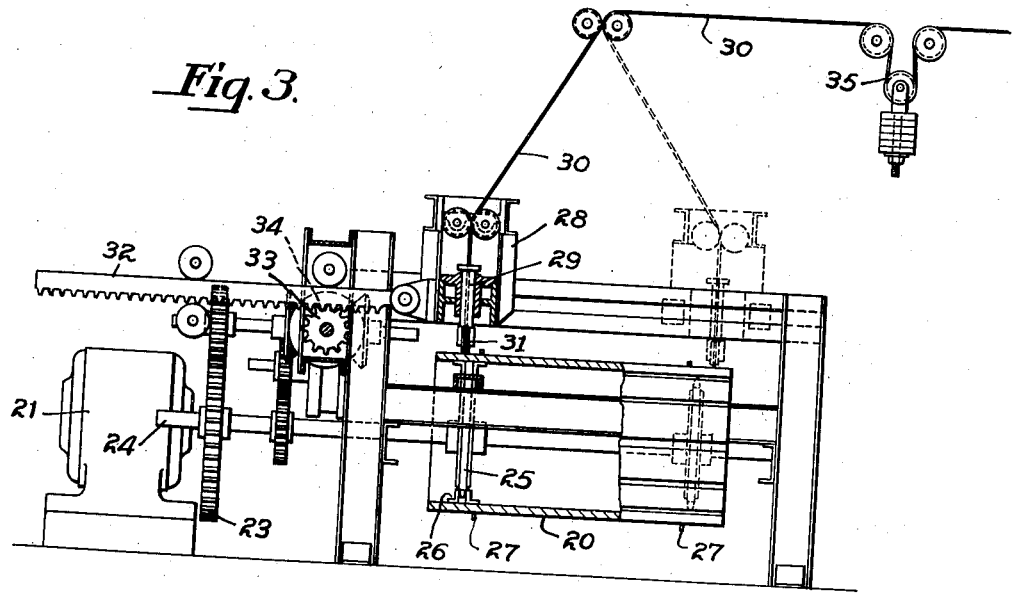
Figure 4:
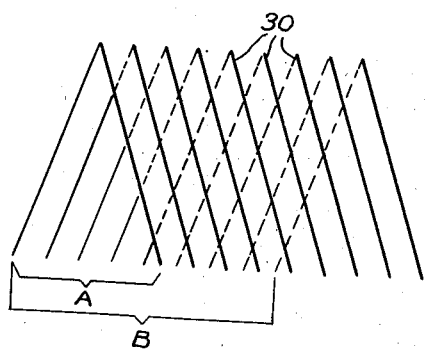
Figure 5:
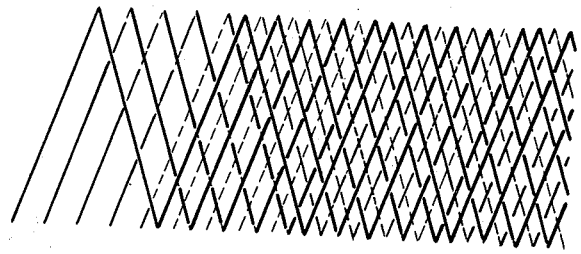
Figure 6:
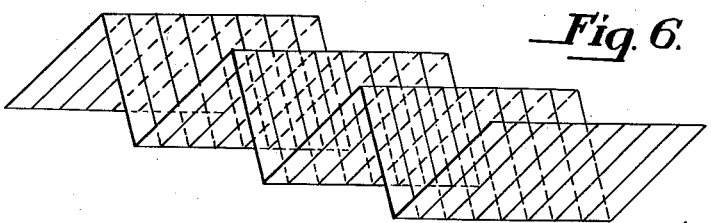
Figure 11:
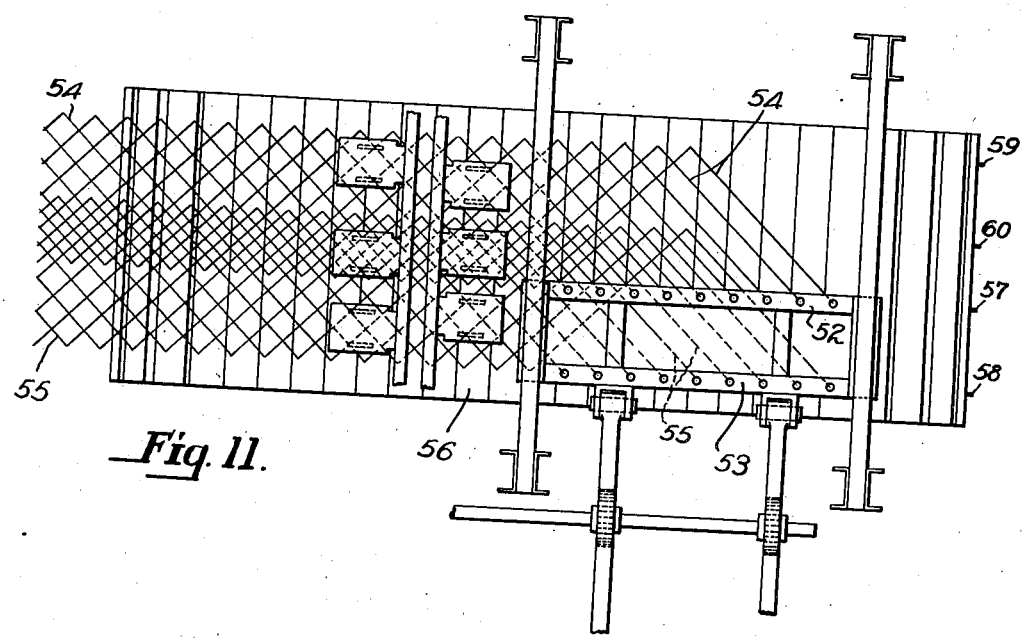
Figure 12:
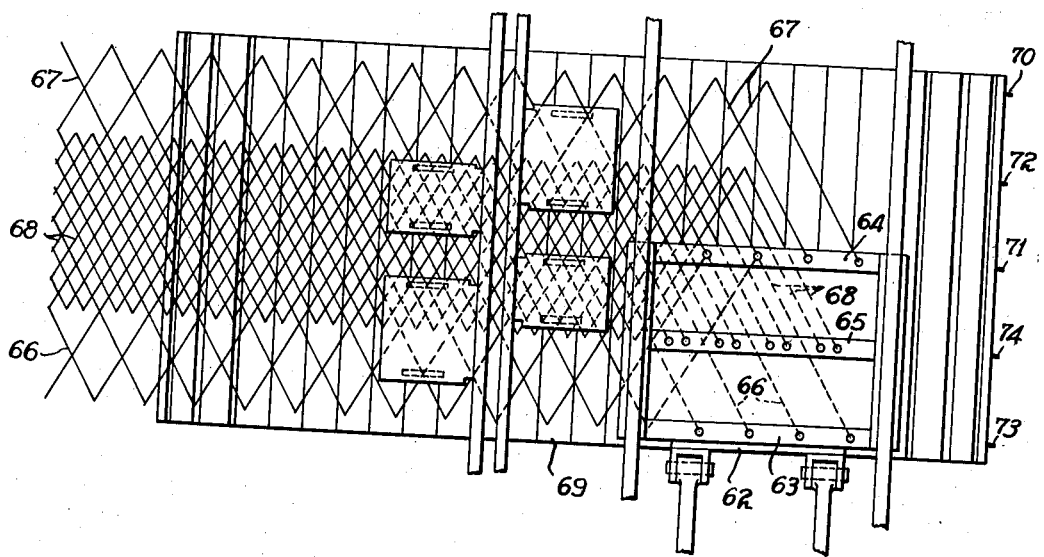
Figure 13:
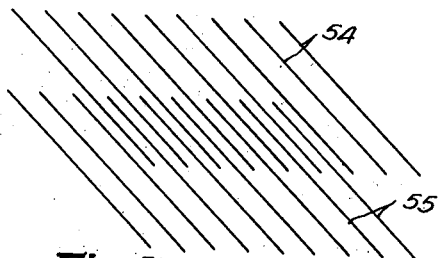
Figure 14:
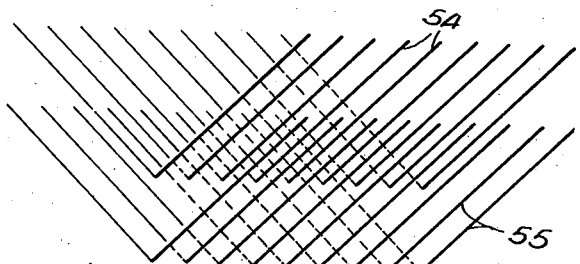
Figure 15:
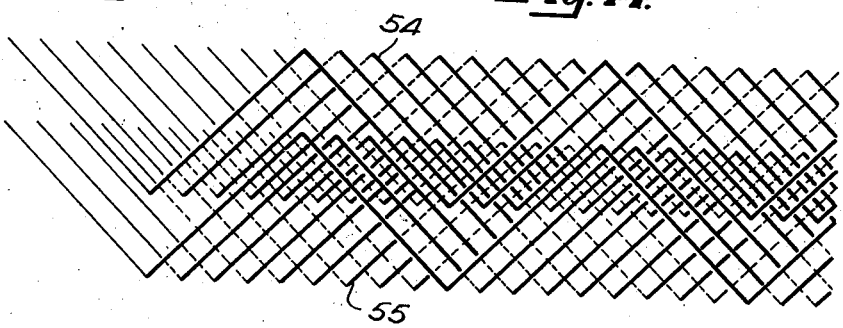

In the accompanying drawings Figure 1 shows a plan view of a machine for making fabric according to one method which I employ; Fig. 2 is a longitudinal sectional view thereof; Fig. 3 is a cross sectional view thereof; Fig. 4 is a view showing the position of the strands at one stage in the process of laying them; Fig. 5 is a view showing a portion of the fabric in its completed form; Fig. 6 is a diagrammatic view showing the lays or folds of Fig. 5 expanded, to more clearly illustrate the manner in which they are laid upon one another; Fig. 7 is a plan view of another form of machine for making a modified form of the fabric shown in Figs. 1 to 5; Figs. 8, 9 and 10 show the fabric of the machine of Fig. 7 in various stages of manufacture; Fig. 11 is a plan showing apparatus for making fabric which is of smaller mesh and of greater strength at its mid portion than near its edges; Fig. 12 is a plan view of apparatus for making a modified form of the fabric shown in Fig. 11; Figs. 13, 14 and 15 are diagrammatic views showing the arrangement of the wires at various stages during the forming of the fabric by the apparatus of Fig. 11, and Figs. 16, 17 and 18 show the fabric of Fig. 12 at its various stages of manufacture.

Referring first to the machine of Figs. 1, 2 and 3, such machine is constructed substantially in accordance with the machine of Figs. 1, 2 and 3 of my Patent No. 1,908,050, to which reference may be made for a more detailed description of the machine parts. The apparatus comrises a conveyor 20 driven from a motor 21 through a pinion 22, gear wheel 23, shaft 24 and suitable sprocket wheels 25. The conveyor bars are carried by suitable chains 26 and are provided with pins or studs 27 at their ends, around which the wires are bent during the process of laying the wires on the conveyor.

A feeding carriage 28 is provided with a series of hollow vertical shafts 29 through which the wire strands 30 for forming the mesh are drawn downwardly past guide rollers 31, mounted upon the lower ends of said hollow shafts, the wires 30 being drawn from reels or other suitable source of supply (not shown) and passing down through the hollow shafts or tubes 29, so that as the carriage is shifted back and forth across the table, the wires will be drawn through the tubes by reason of the traveling movement of the conveyor, and deposited along diagonal lines upon said table, the wires being bent around the pins 27 at each end of the path of transverse travel of the carriage, so that in one direction of movement across the table, the carriage will lay the strands along diagonal lines, and upon its reverse movement will lay the wires along other diagonal lines which cross the first-named lines, all as explained in my Patent 1,908,050. The carriage is reciprocated by means of rack bars 32 driven by pinions 33 which are in turn driven through gearing 34 which is automatically reversed through reverse clutch mechanism, at each end of its path of travel, as explained in my said patent. The wires are maintained in suitable taut position by weight and pulley arrangements, as shown at 35.

After the wires 30 have been laid upon the table to form the diagonal mesh fabric, the crossings thereof, or a desired number of them, are welded together by means of roller electrodes 36ª, in the manner described in my said patent and in my other Patents Nos. 1,581,868 and 1,694,081.

When laying fabric according to the method and by the machine disclosed in my Patent No. 1,908,050, each "lay" of the group of strands overlies approximately one-half of the preceding lay of strands, with the result that the mesh openings, in directions longitudinally of the fabric, are somewhat wider than the spacings between the wires. The present invention discloses a method of so laying the wires that the mesh openings can be of considerably less width than the spacings between the wires, this method permitting of the making of mesh openings of various dimensions without alteration of the laying mechanism. Whereas in my former patent the conveyor and the laying carriage are driven at such relative rates of speed that each lay of the wires through movement of the carriage across the table covers approximately one-half of the preceding lay, in the present instance, and as shown more clearly in Fig. 4, each lay covers approximately three-fourths of the preceding lay of wires. It will be seen that the pitch A is equal to four and one-half spaces of the spacing of the wires of the group or series B. When the carriage has moved across the traveling conveyor and back again, it will deposit two lays of wires, as shown in Fig. 4. A succeeding cycle of movement by the carriage across the table and back, will deposit succeeding portions of the wire strands along lines intermediate the lines upon which the preceding lays have been deposited, with the result that a fabric of finer mesh is produced, as shown in Fig. 5, instead of the relatively wide mesh of Fig. 4. One of the advantages of the method just described is that a fabric of finer mesh can be made when the distance between the strand feeders or guides is limited.

As shown in Figs. 4, 5 and 6, the fabric is formed of nine wires which, as stated above, are recurrently laid or folded inwardly from the edges thereof, the broken lines indicating those portions of the wires which are crossed or covered by a succeeding lay.

In a manner similar to that just described, eight strands, or another even number of strands, may be so laid that the mesh openings in the finished fabric instead of being approximately one-half of the spacing between adjacent wires, as in Fig. 5, may be one-third of such spacing. In such an arrangement, the movement of the carrier 20 relative to the transverse movements of the carriage will be altered so that the wires will be laid on a slightly different angle, and, following the two lays as shown in Fig. 4, there will be succeeding lays which will produce mesh openings of one-third that shown in Fig. 4, instead of reducing such openings by one-half as shown in Fig. 5. In this instance, of course, additional pins 27 would be provided on the conveyor 20 to take care of the additional interspersed lays.

Referring now to Fig. 7, I show a manner in which a fabric may be formed that is reinforced and of smaller mesh along one side thereof, the fabric being composed of a series of strands which are laid across the full width of the fabric, and another series of strands which are laid for only part-width and are partially laid between the layers of the first-named series. In laying the fabric, a feeder 36 is employed that is moved the entire distance across the conveyor 37, to lay the full-width strands, and a feeder 38 which is moved approximately only one-half the distance, those strands which are laid the full distance being indicated by the numeral 39 and the part-width strands by the numeral 40.

Each feeder may be substantially of the form shown in Figs. 1 to 7 of my Patent 1,908,050, or may simply carry vertically disposed guide tubes 41, through which the wires are drawn through spools, not shown, by movements of the conveyor and the carriages or feeders.

The feeder 36 carries rack bars 42 which are driven by pinions on a shaft 43, from a drive shaft 44, a reversing clutch 45, actuated by a cam 46 on a shaft 47, serving to effect reciprocatory movements of the carriage, as explained in my said patent. The carriage 38 is similarly reciprocated by means of rack bars 48, pinions on a shaft 49, which is driven from the shaft 44 through reversing clutch mechanism 50. The cam 51 which operates the clutch 50 is so formed that the carriage 38 will be given two forward and rearward movements each time the carriage 36 is moved forwardly and rearwardly but once. There are eight wires 39 fed by the carriage 36, and but four wires 40 fed by the carriage 38. During each forward stroke of the carriage 36, the carriage 38 is moved forward and backward to make two lays of the wires 40, as shown in Fig. 8. During retractive movement of the carriage 36, the carriage 38 will again move forward and backward, the lays of the strands then being shown as in Fig. 9. The carriage 38 is returned a sufficient distance to permit the wires fed by the carriage 36 to be bent around the pins at the lower or starting edge of the fabric.

Repeated movements of the carriages as above described will produce a fabric as shown in Fig. 10, it being understood that the lays of the wires will be welded or otherwise suitably secured together at at least some of their crossings. The broken lines in Figs. 8 to 10 indicate those portions of the wires which are covered by succeeding lays, and it can be seen from the crossings indicated that certain portions of the narrow-laid wires 40 are enclosed between layers of the widely laid wires 39, and that portions of the wide lays are between layers of the wires 40, and portions of the narrow lays are on top of the wide lays. The lays of the wires 39 and the lays of the wires 40 are thus intermingled, so that they mutually support one another and cannot so readily be torn apart or separated as would be the case if the narrow portion of the mesh were simply secured to the face of the wide-laid strands.

While in Figs. 7 to 10 the strands 40 are shown as laid for approximately one-half of the completed fabric width, it will be understood that it can be made narrower. If the strands 40 are to be laid for only one-fourth of the width of the completed band, for example, and when using eight wires 39 for the wide portion of the band, only two wires would be employed for laying the narrow portion of the band; in which case the carriage for the wires 40 would be moved forward and backward four times during each forward and backward movement of the carriage 36, instead of having only two cycles of movement during one cycle of movement by the carriage 36.

A narrow lay of wires corresponding to the wires 40 can be made adjacent to each edge of the wide lay 39, by employing another carriage similar to the carriage 38, where it is desired to reinforce both edges of the fabric.

In Figs. 11, 13 and 14, I show a method of producing a fabric as shown in Fig. 15, wherein the central portion of the fabric is reinforced and of closer mesh than the edge portions thereof. In this structure I show a single carriage, upon which are mounted a wire-guiding or feed bar 52 and a similar wire feeding bar 53. A group of wires 54 are drawn through the bar 52 and a group of wires 55 are drawn through the bar 53. The bars are moved as a unit and the length of the path of travel of the carriage is such that each bar will be moved to only one edge of the conveyor 56, its movement in the opposite direction terminating at a point somewhat past the longitudinal mid line of the conveyor.

With the carriage in the position shown in Fig. 11, the wires 54 will be bent around studs 57 on the carrier, upon said movement of the carriage, and the wires 55 will be bent around the row of studs 58 on the conveyor. When the carriage is in its foremost position near the opposite edge of the conveyor, and starts upon its return movement, the wires 54 will be bent backward about the studs 59, and the wires 55 will be bent back around the studs 60, these movements being continued to form the completed fabric shown in Fig. 15, it being understood that the strand crossings or certain of them, are welded or otherwise secured together. At the mid portion of the completed fabric, certain of the lays of the wires 54 will overlie lays of the wires 55, and at other portions of the band the wires 54 will underlie lays of the wires 55; thus making for a structure of great strength wherein the two portions of the band cannot be readily torn apart, as explained above in connection with discussion of Fig. 10.

Figure 16:
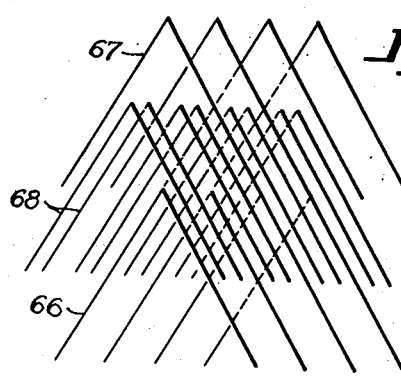
Figure 17:
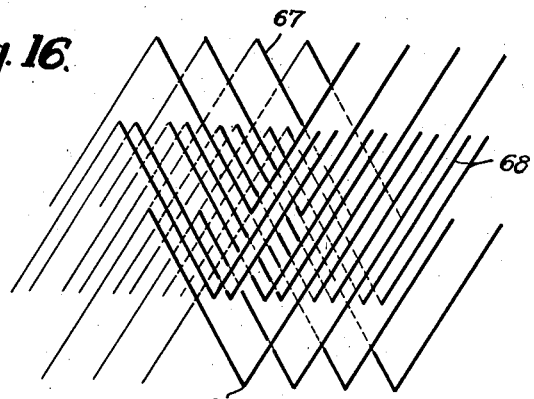
Figure 18:
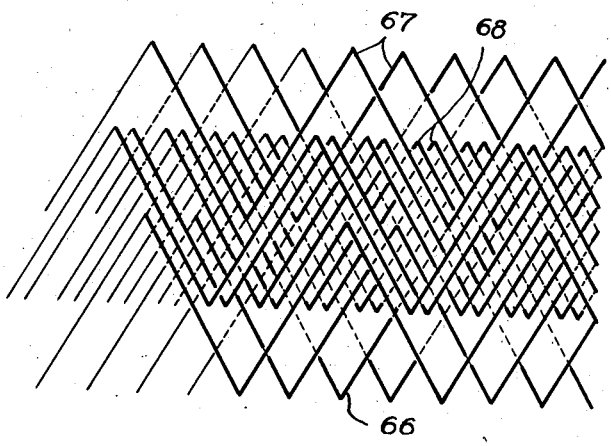

In Figs. 12, 16 and 17, I show a method of making a fabric of somewhat different form than that shown in Fig. 15. In Fig. 12 is shown a carriage 62 upon which are mounted wire guide bars 63, 64 and 65 which are moved as a unit. The bar 63 has guide ways for four strand wires 66; the bar 64 has guideways for four strand wires 67, and the bar 65 has guideways for eight strand wires 68.

The carriage 62 is moved across the conveyor 69 only such distance in one direction as will permit the wires 67 to be looped or bent around the row of studs 70 on the conveyor, the wires 66 to be bent around the row of studs 71, and the wires 68 will be bent around the studs 72, upon beginning of the return movement of the carriage. At the retracted position of the carriage, the wires will be bent around the studs 73; the wires 67 will be bent around the studs 71, and the wires 68 will be bent around the studs 74.

The lays of the intermediate strands 68 partially overlie and partially underlie the lays of the strands 67 and similarly partially overlie and underlie the lays of strands 66.

The method described in connection with the description of Figs. 1 to 6, can also be followed in the making of the fabrics of other figures, insofar as closer spacing may be desired in the lays of the individual groups of fabric. In other words, as shown in Figs. 4 and 5, each lay of a group of wires in the other figures may cover more than one-half of the preceding lay.

Not only does the multilap fabric structure permit of making fabric of very fine mesh, without requiring the feeders to be very closely spaced, but the intermingling of the layers of one series of wires with the layers of another series provides a very strong structure wherein the wires cannot easily be torn apart or separated, and the fabric is more highly resistant to lateral deflections.

The various forms of fabric are preferably formed of wire strands which are welded together at points of intersection to retain them in unitary relation, but it will be understood that:

1. The strands may be of various cross-sectional shapes and areas and differ in the same fabric.
2. The strands may be of other materials than wire, or part be of wire and part of other materials.
3. All or any desired intersections may be welded or strands otherwise retained in relative position.
4. The strands may be fastened together or held in relative position by other than welding means.
5. The strands may be laid on or between other materials or the materials laid on the strands and retained in position. For example, they may be laid on or between sheets of material such as rubber, paper, metals, fiber, etc.
6. Material may be placed between the layers of strands or between only certain strands or supplemental strands, of the weaves and patterns formed.
7. The strands between edges of fabric, may be laid straight or curved or combinations thereof, and in any direction and with constant or varying amplitudes, the mesh openings may be square, diamond, rhomboidal, triangular or have sinusoidal, curved or various other shaped sides.
8. Strands may be separated by other than uniform distances which may be varying distances and may intersect.
9. The strands of the various series may be laid in one direction along certain diagonal lines and in the return direction along diagonal lines of a different angularity relative to the longitudinal center line of the fabric, somewhat as shown in Fig. 32 of my Patent 2,000,788.
10. Where two or more laying carriages are employed to form a fabric, different pattern effects can be secured by moving them non-synchronously, or in somewhat staggered relation to one another.

I claim as my invention:

1. The method of forming fabric, which comprises laying continuous wires by reciprocatory and progressive movements in approximately a given plane, the wires being bent backwardly at each end of the path of reciprocatory movement, with each lay overlying not substantially less than three-fourths of the preceding lay, and uniting the wires so laid.

2. The method of forming fabric, which comprises laying continuous wires by reciprocatory and progressive movements, along diagonal lines, and in approximately a given plane, each lay of wires overlying more than one-half of the preceding lay, and uniting the wires thus laid.

3. The method of forming fabric, which comprises folding laterally-spaced strands back and forth along lines generally diagonal to the longitudinal axis of the fabric, to form overlapping layers, with certain of the layers interposed between other layers and having portion of their strands interspersed with strand portions of the other layers, in directions longitudinally of the fabric, and securing said layers in unitary relation.

4. The method of forming fabric, which comprises folding laterally-spaced strands back and forth along lines generally diagonal to the longitudinal axis of the fabric, to form overlapping layers, with certain of the layers interposed between other layers and having portions of their strands interspersed with strand portions of the other layers, in directions longitudinally of the fabric, and extending only partially across the width of the fabric, and securing said layers in unitary relation.

5. The method of forming fabric, which comprises folding a group of laterally-spaced strands back and forth along lines generally diagonal to the longitudinal axis of the fabric, to form overlapping layers, similarly folding another group of wires to form layers, some of which are disposed between layers of the other group, and securing said layers in unitary relation.

6. The method of forming fabric, which comprises laying a series of wires along lines generally diagonal to the longitudinal center line of the fabric, laying a second series of diagonally-arranged wires upon the first-named layer, bending both series of wires backward upon themselves along other diagonal lines, repeating said movements, and finally uniting the wires so laid.

7. The method of forming fabric, which comprises laying a series of wires along lines generally diagonal to the longitudinal center line of the fabric, laying a second series of diagonally-arranged wires upon the first-named layer, bending both series of wires backward upon themselves along other diagonal lines, repeating said movements, and finally uniting the wires so laid, the two series of wires overlapping one another only at a zone adjacent to the longitudinal center line of the fabric.

8. The method of forming fabric, which comprises laying a series of wires along lines generally diagonal to the longitudinal center line of the fabric, laying a second series of diagonally-arranged wires upon the first-named layer, bending both series of wires backward upon themselves along other diagonal lines, repeating said movements, and finally uniting the wires so laid, the layers of one series being of less width in directions transversely of the fabric than the layers of the other series.

9. The method of forming fabric, which comprises laying a series of wires along lines generally diagonal to the longitudinal center line of the fabric, laying a second series of diagonally-arranged wires upon the first-named layer, bending both series of wires backward upon themselves along other diagonal lines, repeating said movements, and finally uniting the wires so laid, the layers of one series being of less width in directions transversely of the fabric than the layers of the other series, and being disposed in a zone adjacent to one marginal edge of the fabric.

10. The method of forming fabric, which comprises laying a series of wires by reciprocatory and progressive movements to form layers extending from one edge of the fabric partially across the width of the fabric, and simultaneously laying another series of wires in a similar manner, the layers of said other series extending inwardly from the opposite edge of the fabric and portions of said layers interposed between portions of the first-named layers.

11. The method of forming fabric, which comprises progressively laying a series of laterally-spaced wires along lines that extend back and forth across the width of the fabric, to form a mesh having openings of given widths, and laying a second series of laterally-spaced wires which are displaced relatively to the first series, in directions longitudinally of the fabric, wires of one series being placed in interspersed relation to wires of the other series, in directions perpendicular to the plane of the fabric.

12. The method of forming fabric, which comprises progressively laying a series of laterally-spaced wires along lines that extend back and forth across the width of the fabric, to form a mesh having openings of given widths, and laying a plurality of additional series of laterally-spaced wires, the wires of each series being displaced relative to the wires of the other series, in directions longitudinally of the fabric, and the wires of each series being interspersed with wires of another series, in directions perpendicular to the plane of the fabric.

WILLIAM EDGAR REED.